A. W. MORRILL.
FUMIGATING TENT AND THE PROCESS OF USING THE SAME.
APPLICATION FILED DEC. 30, 1907.
902,674.
Patented Nov. 3, 1908.
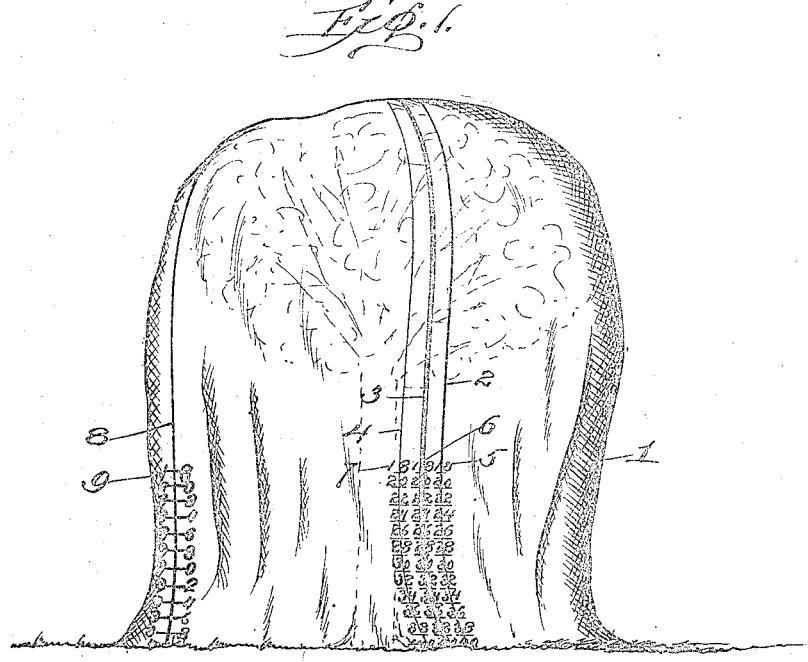
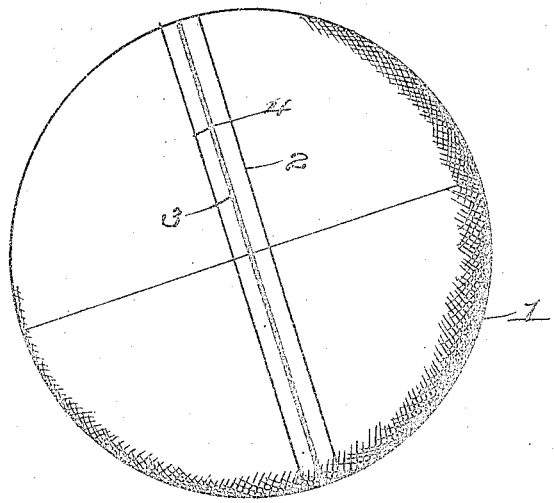

UNITED STATES PATENT OFFICE.

AUSTIN W. MORRILL, OF ORLANDO, FLORIDA.

FUMIGATING-TENT AND THE PROCESS OF USING THE SAME.

No. 902,674.

Specification of Letters Patent.

Patented Nov. 3, 1908.

Application filed December 30, 1907. Serial No. 408,670.

(DEDICATED TO THE PUBLIC.)

*To all whom it may concern:*

Be it known that I, AUSTIN W. MORRILL, a citizen of the United States, residing at Orlando, in the county of Orange and State of Florida, have invented certain new and useful Improvements in Fumigating-Tents and the Process of Using the Same; and I do hereby declare the following to be a full, clear, and exact description of the invention, such as will enable others skilled in the art to which it appertains to make and use the same.

This invention relates to improvements in fumigating tents, and the process of using the same, and has for an object the provision of a tent arranged to indicate certain dimensions of the space inclosed by means of which the amount of chemicals necessary for the proper fumigation of the plant or tree inclosed by the tent can be estimated.

This application is made under the act of March 3, 1883, chapter 143 (22 Stat., 625), and the invention herein described and claimed may be used by the Government of the United States or any of its officers or employees in the prosecution of work for the Government or by any person in the United States, without payment to me of any royalty thereon.

Another object in view is the provision of a tent so marked that the handling thereof and changing from tree to tree is greatly facilitated by enabling the operators to distinguish readily the location of certain rings or places for attachment of ropes and poles and to arrange the tent in a position convenient for handling.

A further object in view is the provision of a process for properly fumigating trees wherein the proper steps in the process are suggested or indicated by certain numerals on a tent used in connection with the process.

In the accompanying drawings: Figure 1 is a perspective view of a tent arranged to indicate the dimensions from which the amount of chemicals necessary to fumigate the tree inclosed thereby can be calculated. Fig. 2 is a top plan view of Fig. 1.

In practicing my process for the fumigation of trees and determining the amount of the chemicals or gases necessary, it is designed to use a tent as 1, shown in the accompanying drawings forming part of the specification hereof. The tent 1 may be made of any desired size and shape, similar to those in general use for tree fumigation. The principal feature of this tent comprises lines in suitable locations passing across the tent from or near one margin to the opposite margin with a series of numbers 5, 6 and 7 placed thereon at suitable intervals, for instance, one foot apart, for indicating the distance over the top of the tent when in use. These lines may be of any desired number but most conveniently consisting of four as shown in Figs. 1 and 2. Three of these, 2, 3, and 4 are parallel and located at convenient intervals, for instance, 30 or 36 inches, so that when the tent is not exactly centered over the tree the operators can select the line which in their judgment is best suited for showing the approximate distance over the top of the tent from ground to ground. For aiding in the easy recognition of the three lines, the central line, 3, which passes as near as practicable through the center of the tent, is much wider than the two lines, 2 and 4, running parallel thereto. The fourth line, 8, is at right angles to the three parallel lines, 2, 3, and 4, and crosses number 3 at a point which, as near as it is practicable to calculate, is the center of the tent when it is spread flat. Each of these lines is marked with a suitable scale indicating either the total distance across the tent from one point marked with a certain number, as for instance 40, to the corresponding point on the other side of the tent whether spread flat or covering a tree in position for use, or the number may indicate one half of this distance. In the first case the distance over the top of the tent when in use is represented by the average of the two readings at the ground at opposite sides of the tent on a given line. In the second case the sum of the two readings indicates this distance.

When it is desired to fumigate a tree the tent is placed over the tree in the customary, or any desired manner, with the edges of the tent permitted to rest on the ground as shown in Fig. 1. The tent is pulled into such a position that at least one of the lines passes so nearly over the center of the tree that it is serviceable in obtaining this measurement over from the ground on one side to the ground on the other. Having selected the line best adapted for use in the case of the particular tree to be fumigated, readings are made on opposite sides of the tree and the distance over calculated in one or the other manner as indicated above. If the tree is irregular in form a similar reading may be made on a line running at right angles to the first and passing approximately over the center of the tree. The average of the readings in the two directions will give this dimension sufficiently close for practical purposes. The distance around the base of the tented tree is next obtained either by means of a tape or by one of the operators pacing and basing thereon an estimate of this measurement. Having thus obtained these two measurements the proper dose, or amount of chemical or insecticide matter, is found by reference to tables so arranged as to show the doses for tented trees with different measurements. Such tables are based on experience, or experimental tests with different insect pests, thus determining the most satisfactory dose for trees with different measurements when covered with the tent. The following is an illustration of the form of such a table designed for use with an imaginary insect pest infesting trees which when covered with a tent measure from 20 to 30 feet over the top from ground to ground, the amount being given to the nearest half ounce:

| Distance over. | Circumference. | | | | | | |
|---|---|---|---|---|---|---|---|
|  | 15 | 20 | 25 | 30 | 35 | 40 | 45 | 50 |
|  | Ounce. | Ounce. | Ounce. | Ounce. | Ounce. | Ounce. | Ounce. | Ounce. |
| 20 | 5 | 5 | 5 | 5 | 5 |  |  |  |
| 22 |  | 5 | 5½ | 6 | 6 | 6½ |  |  |
| 24 |  | 6 | 6½ | 6½ | 7 | 7½ | 8 |  |
| 26 |  |  | 7½ | 7½ | 8 | 8½ | 8½ |  |
| 28 |  |  | 8½ | 9 | 9 | 9½ | 10½ | 11 |
| 30 |  |  |  | 10 | 10½ | 11 | 11½ | 12 |

Any desired chemical can be used or any desired gas, as hydrocyanic acid gas, for destroying the insects that infest the trees. After the gas or other chemicals or insecticide has been permitted to do its work the tent is removed and placed upon another tree and the measurement made and the required amount of insecticide materials ascertained as before.

What I claim is:

1. In a fumigator a tent formed with a line running across the same from one side to the other across the top when in position covering a tree, and an auxiliary line at right-angles to said first mentioned line, said lines being provided with indicating symbols for indicating the distance from one side to the other over the top thereof.

2. In a fumigator a tent formed with a plurality of lines extending from one side to the other across the top of the tent when in position covering the tree, a plurality of sets of numerals at each end of said lines for indicating the distance across the tent over the top thereof from one side to the other, and an auxiliary line running at right-angles to said first mentioned lines, said auxiliary lines being provided with a plurality of indicating symbols for indicating the distance across the tent from one side to the other, over the top at right-angles to the first mentioned lines.

3. In a fumigator a tent formed with a plurality of lines extending from one side to the other across the top of the tent when in position covering the tree, sets of numerals at each end of said lines for indicating the distance across the tent over the top thereof from one side to the other, and a line running at right-angles to said first mentioned lines, said second mentioned line being provided with indicating symbols for indicating the distance across said tent from one side to the other, over the top at right-angles to the first mentioned lines.

In testimony whereof I affix my signature in presence of two witnesses.

AUSTIN W. MORRILL.

Witnesses:
ROBERT P. BRYDON,
W. W. YOTHERS.